United States Patent

Nagasaka et al.

[19]

[11] Patent Number: 5,974,218
[45] Date of Patent: Oct. 26, 1999

[54] METHOD AND APPARATUS FOR MAKING A DIGEST PICTURE

[75] Inventors: Akio Nagasaka, Kokubunji; Takafumi Miyatake, Hachioji; Yoshikazu Amano, Miura; Shigeru Hirahata, Yokohama, all of Japan

[73] Assignee: Hitachi, Ltd., Tokyo, Japan

[21] Appl. No.: 08/634,354

[22] Filed: Apr. 18, 1996

[30] Foreign Application Priority Data

Apr. 21, 1995 [JP] Japan ................................. 7-096494

[51] Int. Cl.⁶ ........................................................ H04N 5/76
[52] U.S. Cl. ............................... 386/46; 386/83; 386/95
[58] Field of Search ............................. 386/46, 83, 121, 386/95, 111, 112, 125, 124, 68; 352/129; 345/473; 348/906, 564; H04N 5/76

[56] References Cited

U.S. PATENT DOCUMENTS

| | | | |
|---|---|---|---|
| 4,873,584 | 10/1989 | Hashimoto | 386/83 |
| 5,083,860 | 1/1992 | Miyatake et al. | 352/129 |
| 5,157,511 | 10/1992 | Kawai et al. | 386/68 |
| 5,450,210 | 9/1995 | Yoo | 386/95 |
| 5,459,830 | 10/1995 | Ohba et al. | 345/473 |
| 5,479,265 | 12/1995 | Kim et al. | 386/124 |
| 5,546,191 | 8/1996 | Hibi et al. | 386/83 |
| 5,576,950 | 11/1996 | Tonomura et al. | 386/121 |
| 5,818,439 | 10/1998 | Nagasaka et al. | 345/327 |

FOREIGN PATENT DOCUMENTS 3-35431  2/1991  Japan .

*Primary Examiner*—Huy Nguyen
*Attorney, Agent, or Firm*—Antonelli, Terry, Stout & Kraus, LLP

[57] ABSTRACT

A method for presentation of information of a recorded television program for allowing user to seize easily and quickly content/composition thereof, and an easily manipulable interface therefor. Picture signal of a television program currently being recorded by a VTR or the like is converted into a frame-based picture signal. Frames indicating inter-shot transitions are detected and stored as shot-representative pictures for thereby generating a digest picture file composed of a set of the shot-representative pictures substantially simultaneously with recording operation of the VTR. In a digest picture display, the shot-representative pictures are displayed in a temporally sequential order in which they were generated in such a form that a predetermined number of shot-representative pictures are displayed in each of predetermined time zones in a uniform array, for facilitating comprehension of the contents of the television picture as recorded. Additionally, by selecting one of the shot-representative pictures being displayed a temporal position of the television picture from which reproduction is to be started can visually be determined.

22 Claims, 14 Drawing Sheets

FIG.11

DISPLAY OF PLURAL DIGESTS FOR PLURAL TV PROGRAMS

| RESERVATION ID NUMBER | SHOT-REPRESENTATIVE PICTURES |
|---|---|
| 1 | 11:00 ~ 11:30  1ch  TRIPLE SPEED<br>☐ ☐ ☐ ☐ ☐  — 1102 |
| 2 | 21:00 ~ 21:55  8ch  STANDARD SPEED<br>☐ ☐ ☐ ☐ |
| 3 | 20:00 ~ 20:55  10ch  TRIPLE SPEED<br>☐ ☐ ☐ ☐ ☐ |
| 4 | |

1100

METHOD AND APPARATUS FOR MAKING A DIGEST PICTURE

CROSS REFERENCE TO RELATED APPLICATIONS

The present application relates to subject matter described in U.S. Pat. No. 5,083,860 issued on Jan. 28, 1992, entitled "METHOD FOR DETECTING CHANGE POINTS IN MOTION PICTURE IMAGES", and U.S. patent application Ser. No. 08/601,363 filed on Feb. 16, 1996, now U.S. Pat. No. 5,818,439, entitled "VIDEO VIEWING ASSISTING METHOD AND A VIDEO PLAYBACK SYSTEM THEREFOR" based on Japanese patent application No. 7-30418 filed on Feb. 20, 1995, the disclosure of which is hereby incorporated by reference.

BACKGROUND OF THE INVENTION

The present invention generally relates to a method and an apparatus for watching videos (motion pictures) such as those of television programs. In particular, the invention is concerned with a method and an apparatus for generating or making a digest picture of a television program in order to allow the content and composition of the television program as recorded to be seized or understood easily and speedily. Furthermore, the present invention is directed to a method and an apparatus for recording a television program or programs by reservation in advance, which apparatus is imparted with a digest picture making capability or function.

Many of the television program recording apparatuses such as a video tape recorder (VTR in abbreviation) or the like now on the market are equipped with a function for recording a television program by programming the recording start and end times in advance hereinafter also referred to as the programmed recording function. By making use of this function, the user can enjoy desired television programs at any time and/or place which he or she desires. Besides, in such a case where two television programs to be watched fall within a same time period, it is possible to watch one of the television programs while the other is on a different channel being recorded so that the latter can be enjoyed later on at a time available for the user. In this conjunction, it is however noted that the television program as recorded through the reservation recording may often be left as it is without being enjoyed for the reason that a time therefor is unavailable or the user can not be reminded of or identify the recording medium such as a video tape, video disk and the like on which a television program of concern has been recorded or for some other reasons. In the worst case, the user may use a recording medium having recorded thereon a program not yet enjoyed for recording another program. In that case, the former is erased because of overwriting of the latter. Such inconveniences are ascribable partly to the fact that the video recording/reproducing or playback apparatus such as video disk recorders, video tape recorders and the like (hereinafter also referred to collectively as the video recorder or video recording/reproducing apparatus) now commercially available are not equipped with an adequate function for allowing the contents of the television programs as recorded to be confirmed speedily and easily. Besides, it is noted that all the television programs recorded by reservation in advance are not always worth viewing throughout the whole program. Some users may want to watch only a few interesting scenes of a given television program. In that case, viewing such television program throughout from the start to the end thereof takes lots of time, intolerably for the user.

Some of the video tape recorders currently on the market are equipped with a function for recording on a portion of a tape the information of a title of a television program recorded on that tape together with information concerning the date of recording for the purpose of allowing the title of the program and the date of recording to be displayed on a television screen. With such type video tape recorders, the contents recorded on a magnetic tape can certainly be checked on a program-by-program basis by using the title as a clue. However, it is impossible to display the picture information in a list in such a manner that the user can visually confirm successfully the contents of the television programs recorded on the magnetic tape.

For grasping the content of the video selected on the basis of the information of the titles displayed in a list, there may be conceived a method of viewing the video by reproducing it at a high speed. In reality, such type video recorder is known which has a function to enable the contents of the recorded television program inclusive of sound to be confirmed at a double reproducing speed i.e., at twice as high a reproducing speed as a standard or normal speed.

However, in the high-speed reproduction of a recorded television program, the video thereof is reproduced thoroughly and uniformly from the start to the end thereof, which means that those picture portions which play essentially no role in making the gist or essence of the television program be grasped are equally displayed in vain. To say in another way, the time utilization efficiency in the reproduction of the television program is for confirmation of the content thereof extremely poor. Besides, because the reproduction of a recorded television program or video is performed time-sequentially regardless of the reproducing speed, no more than one scene can be displayed meaningfully on the monitor or television screen. Thus, difficulty will be encountered in understanding consistently the composition or story of such sort of television program in which inter-scene temporal relations are important for enjoying the same, giving rise to another problem.

As a video recording/reproducing apparatus in which a video disk is employed as the recording medium, there has already been proposed a so-called disk player which is designed to output intermittently a picture signal by repeating alternatively a fast feeding or scanning operation and a normal or standard reproduction in precedence to the intrinsic reproduction, starting from a record start position of a recording disk, by means of a fast feeding mechanism, as is disclosed in JP-A-3-35431. More specifically, the fast feeding or scan operation and the normal reproduction are repeated at a predetermined time interval regardless of the contents recorded on the video disk. Since the video disk can be accessed at random, the scan time taken for the fast feeding from a current location or area to a next one is certainly negligible. However, there arises a problem that the scene of interest or importance can not always be displayed because the locations or areas to be reproduced intermittently are specified in terms of the predetermined time interval. Besides, because the picture retrieved by the normal reproduction is displayed intermittently on the whole television screen as it is, confirmation of all the contents of the video of concern will involve considerable time consumption due to need for reproduction of all the locations or areas to be reproduced, thus rendering it extremely difficult or impossible to seize all the content of the video at once.

SUMMARY OF THE INVENTION

In the first place, definition or meaning of the phrase "digest information" or "digest picture information" used herein will be clarified. With the terms "digest information" or "digest picture information" or "digest picture", it is intended to mean such information which is so digested that a large amount of corresponding information can be grasped or understood within a short time. By way of example, as typical one of such information, there may be mentioned a so-called promotion video of a length of several minutes which can be generated by compiling appropriately only highlight scenes selected from a motion picture or the like program of a time duration which may amount to a few or several hours. However, discriminative identification of the highlight scenes from the others requires an abundance of knowledge and enhanced understandability for the content of the picture. Thus, with the conventional picture or image recognition techniques known heretofore, it is still impossible for a machine to generate or compile automatically a promotion video in real time by extracting the scenes of importance from a picture of concern without intervention of human being. In this conjunction, it should be emphasized that there has heretofore been proposed no apparatus which can generate automatically a digest picture of a television program in real time in the course of recording thereof by a video recorder.

In view of the state of the art described above, it is a primary object of the present invention to provide a method and an apparatus for making a digest picture of a television program, which make it possible to seize or grasp the content and composition (structure or flow) of a video speedily even at a time point immediately after recording thereof by a recording apparatus connected to the digest making apparatus.

It is a second object of the present invention to provide a digest making apparatus and a method therefor which can present a digest picture of a video in such a manner that content and composition of the video as recorded can be seized at sight without difficulty.

A third object of the present invention is to provide a digest making apparatus and a method therefor capable of controlling reproduction of a video in a video recording/reproducing apparatus connected by selecting a given scene from the video recorded.

A fourth object of the present invention is to provide a digest making method and a digest making apparatus capable of generating in parallel with recording of a video reserved in advance in a video recording/reproducing apparatus such digest information which allows content of the video to be grasped or understood at a glance.

Further, a fifth object of the present invention is to provide a method of presenting content and composition of a television program recorded during user's absence in such a manner that he or she can quickly understand the television program as recorded. In this conjunction, it is also an object of the invention to provide a manipulation-easy interface facility designed to this end.

In view of the above and other objects which will become apparent as the description proceeds, there is provided according to an aspect of the present invention a digest making apparatus which is connected to a recording apparatus capable of recording at least a television signal of a television program received through a receiving circuit. The digest making apparatus is so implemented as to generate a digest picture list which is constituted by a set of inter-shot transitions (i.e., changing points of shots of picture) in the television program in parallel with recording of the television program by the recording apparatus. To this end, the digest making apparatus comprises an input/output interface for controlling input/output of the picture signal supplied to or outputted from the digest making apparatus, a converting unit for converting the input picture signal into a frame-based picture signal, a detecting unit for fetching the frame-based picture signal and for detecting or representative pictures those frames which correspond to the inter-shot transitions of the television program, respectively, a storage unit for storing the digest picture constituted by a set of the representative pictures, and a display control unit for displaying the digest picture in the form of a list on an external display unit connected to the digest making apparatus.

In a preferred mode for carrying out the invention, display of the digest picture may be so controlled that the shot-representative pictures constituting the digest picture are classified in dependence on time zones in which the individual shot-representative pictures are fetched, respectively, in order to allow the user to grasp the content of the relevant program at sight.

Further, in carrying out the invention, it is preferred to adopted such arrangement that when a given one of the shot-representative pictures in a digest list picture being displayed for a television program is selected, then the position at which the selected shot-representative picture occupies in the program is transmitted to the video recording/reproducing apparatus as information of the position at which the reproduction is to be started.

Needless to say, the teachings of the present invention can equally be applied to the recording of a television program or programs by reservation in advance. In that case, information concerning the time points at which a program reserved for recording is to start and end, respectively, and which are set in the associated video recording apparatus is supplied to the digest making apparatus for allowing the digest picture generation processings to be performed concurrently with the program recording mentioned above.

Thus, according to another aspect of the invention, there is provided a digest making apparatus which includes an interface unit or device for setting a time zone and a television channel for a program to be recorded by reservation in advance such as recording during the user's absence, a digest making unit for generating digest information which can represent contents and composition of a video or television program as recorded, a timer for starting and ending operation of the digest making unit at the preset time points, respectively, and a unit for displaying the digest information as generated.

Other component devices or units which can be employed in the digest making apparatus mentioned above will be made clear as the description proceeds.

With the arrangement of the digest making apparatus described above, it can easily checked whether or not a program recorded by reservation is worth viewing, whereby a temporal restriction or burden imposed onto the user can be mitigated significantly.

Further objects, features and advantages of the present invention will become apparent to those of ordinary skill in the art upon reading the following detailed description of the preferred and alternate embodiments.

BRIEF DESCRIPTION OF THE DRAWINGS

The invention will be described in conjunction with certain drawings which are for the purpose of illustrating the preferred and alternate embodiments of the invention only, and not for the purposes of limiting the same, and wherein:

FIG. 11 is a view showing, by way of example, a program selection display in case a plurality of digest pictures are generated for a corresponding number of programs, respectively;

DETAILED DESCRIPTION OF THE PREFERRED EMBODIMENTS

Figure 1:
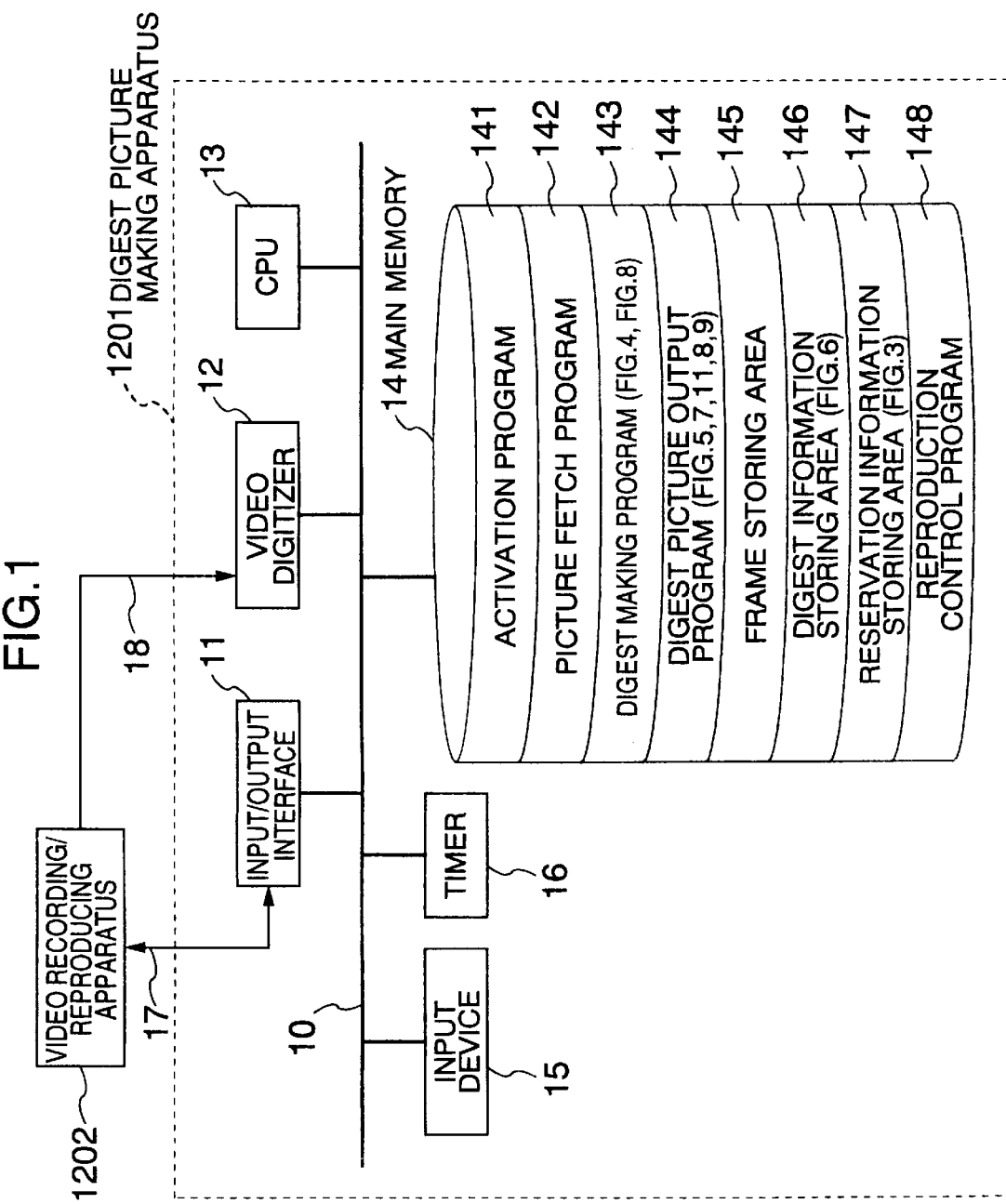
FIG. 1 is a block diagram showing a general arrangement of a digest making apparatus according to an embodiment of the present invention.

Now, the present invention will be described in detail in conjunction with what is presently considered as preferred or typical embodiments as well as modifications thereof by reference to the drawings. In the following description, like reference characters designate like or corresponding parts throughout the several views. Also in the following description, it is to be understood that such terms as "digest", "list", "row" and the like are words of convenience and are not to be construed as limiting terms.

At first, with a view to clarifying the concept or principle underlying the present invention, a structure as well as operation of a video system including a digest making apparatus for generating or making a digest of a television program will briefly and generally be described by reference to FIG. 12.

Needless to say, in case a television program received through a receiving circuit (not shown) is to be simply enjoyed, the television program is displayed intact or straightforwardly on a display screen of a television receiver 1203. On the other hand, when the television program as received is to be recorded, this can be accomplished by operating a video recording/reproducing apparatus 1202. In this conjunction, it should first be mentioned that the invention is never restricted to any specific type of recording medium. When the television program is recorded by the video recording/reproducing apparatus 1202, data or information of a digest picture is generated by a digest making apparatus 1201 concurrently with the recording of the television program.

A printer 1204 is used for printing out a digest picture generated by the digest making apparatus 1201. In the case of the video system shown in FIG. 12, the printer 1204 is shown as connected to the digest making apparatus 1201. However, it goes without saying that the printer 1204 is not indispensably required. Only when the print-out of the digest picture is desired is the printer employed.

FIG. 1 shows, by way of example, a general arrangement of the digest making apparatus 1201.

As can be seen in FIG. 1, the digest making apparatus 1201 is comprised of an input/output interface unit 11, a video digitizer 12, a CPU (central processing unit) 13, a main memory generally denoted by 14, a command input device 15 and a programmable timer 16. These components are mutually interconnected by way of a bus 10. Further, in FIG. 1, reference numeral 17 designates a control signal employed for controlling a video recording/reproducing apparatus, as will be described later on, and numeral 18 denotes an analogue video or picture signal outputted from the video recording/reproducing apparatus 1202. At this juncture, it should be mentioned that when the video recording/reproducing apparatus is implemented in such a structure as to output the picture signal in the form of a digital signal, the control signal 17 contains a digital picture signal, rendering thus unnecessary the use of the video digitizer 12 as well as the analogue video signal 18.

The main memory 14 stores or contains therein

Figure 6:
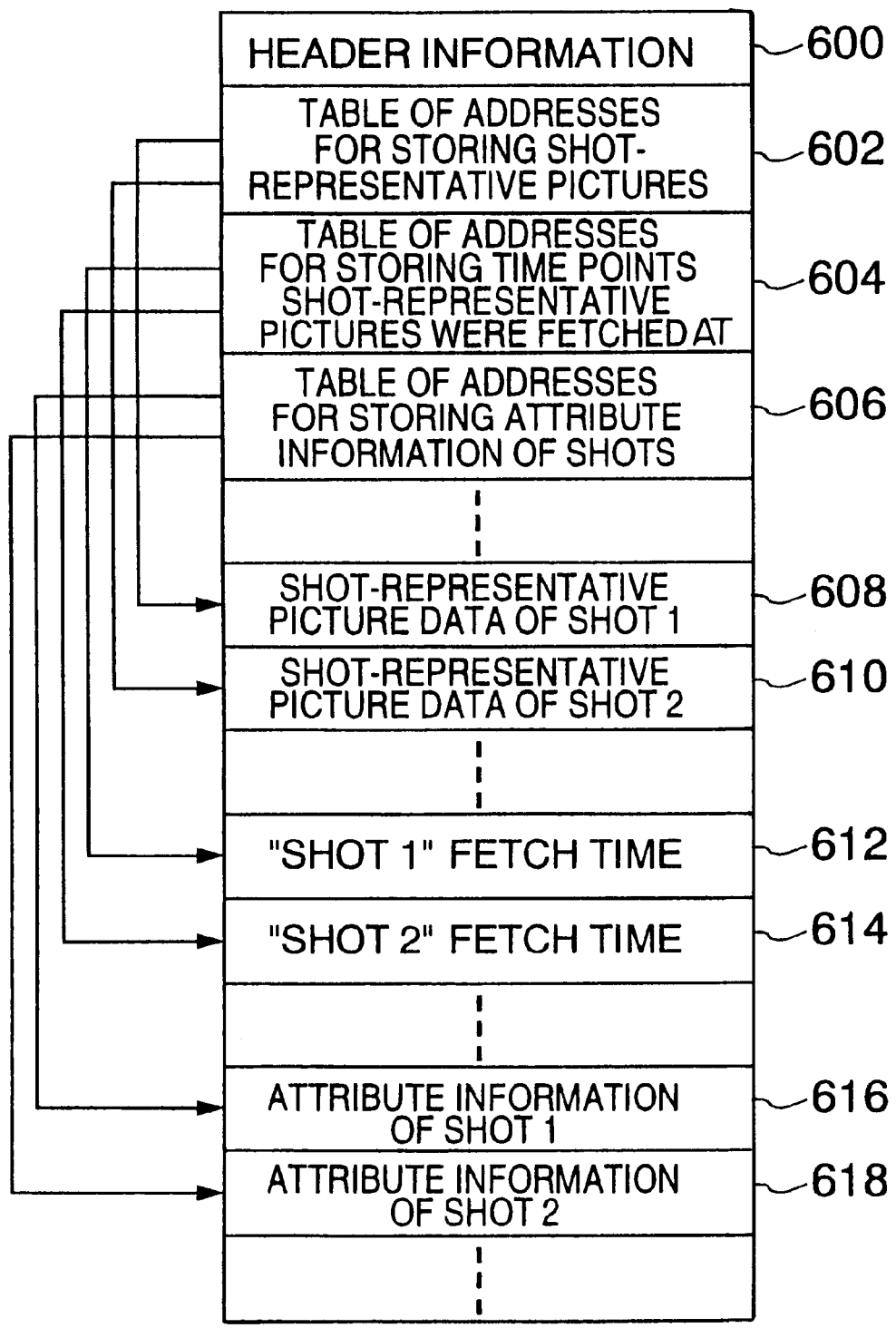
FIG. 6 is a view for illustrating, by way of example, a file structure of information for a digest picture.

① an activation program 141 for initializing the digest making apparatus 1201 to thereby establish a state for enabling execution of programs mentioned below, ② a picture fetch program 142 for fetching on a frame-by-frame basis a motion picture signal inputted by controlling the video digitizer 12, ③ a digest making program 143 for generating or making a digest picture by using the frame pictures made available by the picture fetch program 142, ④ a digest picture output program 144 for controlling display of the digest picture, ⑤ a frame storing area 145 for storing once the frame pictures obtained with the aid of the picture fetch program 142 (note that the frames for which change of shots or inter-shot transition has been decided by the digest making program 143 are erased), ⑥ a digest information storing area 146 for storing the digest picture as generated in a file of a structure such as shown in FIG. 6, ⑦ a reservation information storing area 147 for storing information concerning reservation of picture recording such as information of a recording start time, a recording end time, a channel for receiving a program to be recorded, etc., when recording reservation function (i.e., function for recording a television program by reservation in advance of the video recording/reproducing apparatus is made use of, and ⑧ a reproduction control program 148 which responds to selection of a given picture (picture representative of shots, hereinafter also referred to as the shot-representative picture) from a digest list picture being displayed, for thereby controlling the reproduction of a corresponding program performed by the video recording/reproducing apparatus, starting from a position designated by that selected shot-representative picture.

Figure 12:
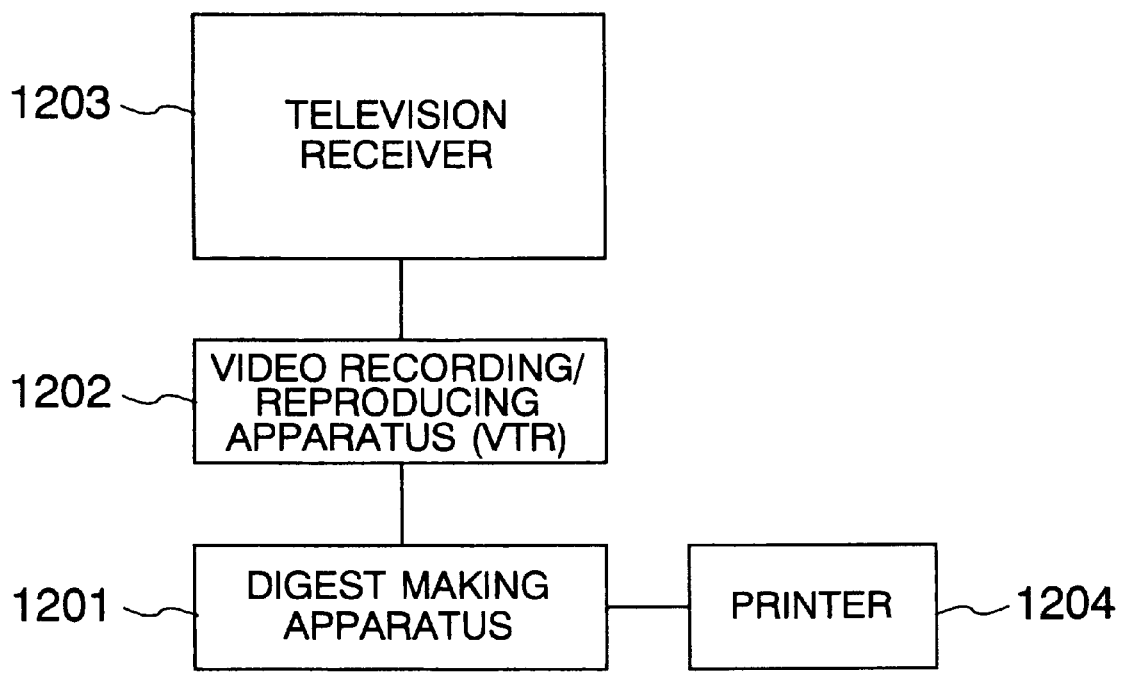
FIG. 12 is a block diagram showing only schematically an interconnection of a digest making apparatus with other video equipment.
Figure 13:
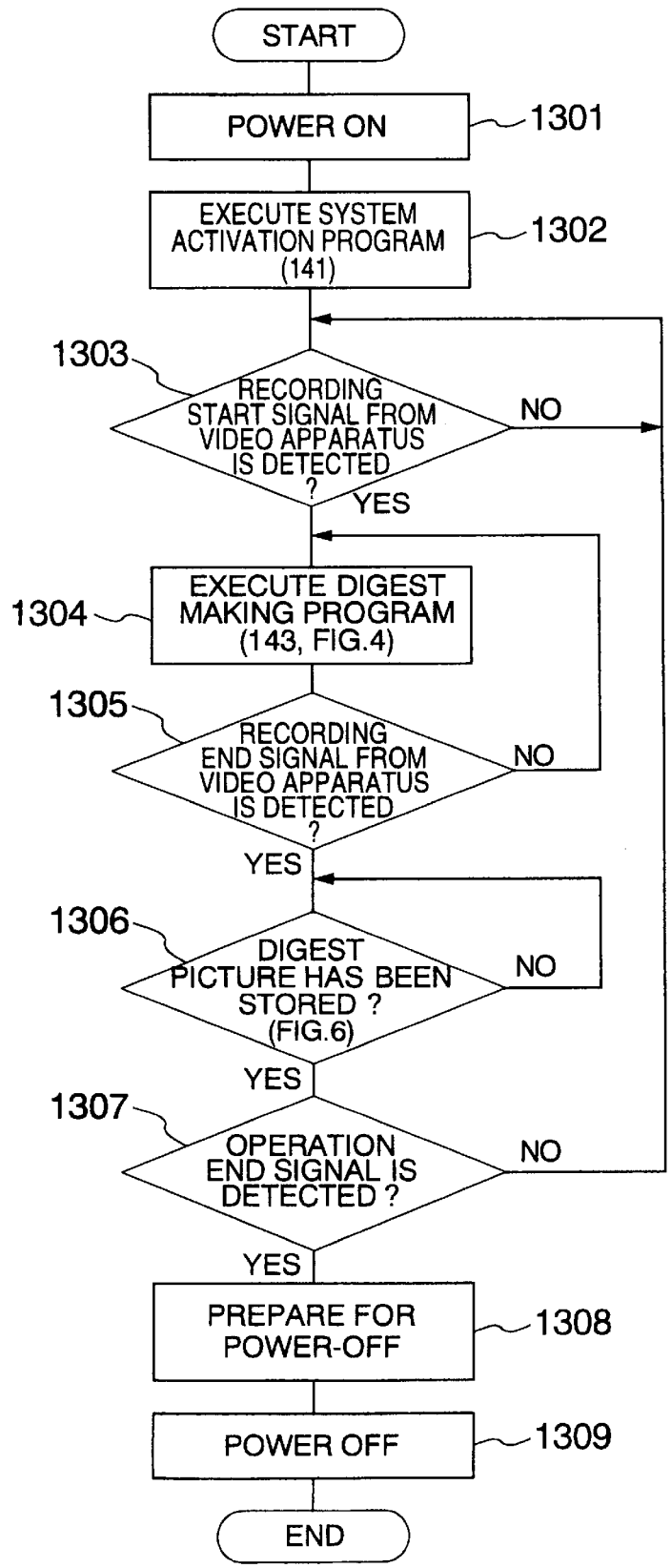
FIG. 13 is a flow chart for illustrating, by way of example only, a procedure for generating a digest picture according to the teachings of the present invention.

FIG. 13 is a flow chart for illustrating a recording of a television program by the video recording/reproducing apparatus equipped with the digest making apparatus 1201 (see FIG. 12).

When the digest making apparatus 1201 is powered on (step 1301), the CPU 13 starts processing operations in accordance with the activation program 141 stored in the memory 14 (step 1302). For convenience of the user, power-on of a power supply source of the digest making apparatus may be interlocked with that of the video recording/reproducing apparatus.

Motion pictures (hereinafter referred to as the video) such as those of television programs broadcast through the medium of a ground wave, satellite broadcasting, cable network or the like are received by the television receiver or the video recording/reproducing apparatus, whereon video signals as obtained are fetched by way of the video digitizer 12. The motion picture or the video features a succession of still pictures referred to as the frames which are intermittently and successively displayed from one to another at a high speed in a manner similar to, for example, animated cartoons. These frames are fetched to be stored in the frame storing area 145 on a frame-by-frame basis by means of the video digitizer 12.

Figure 4:
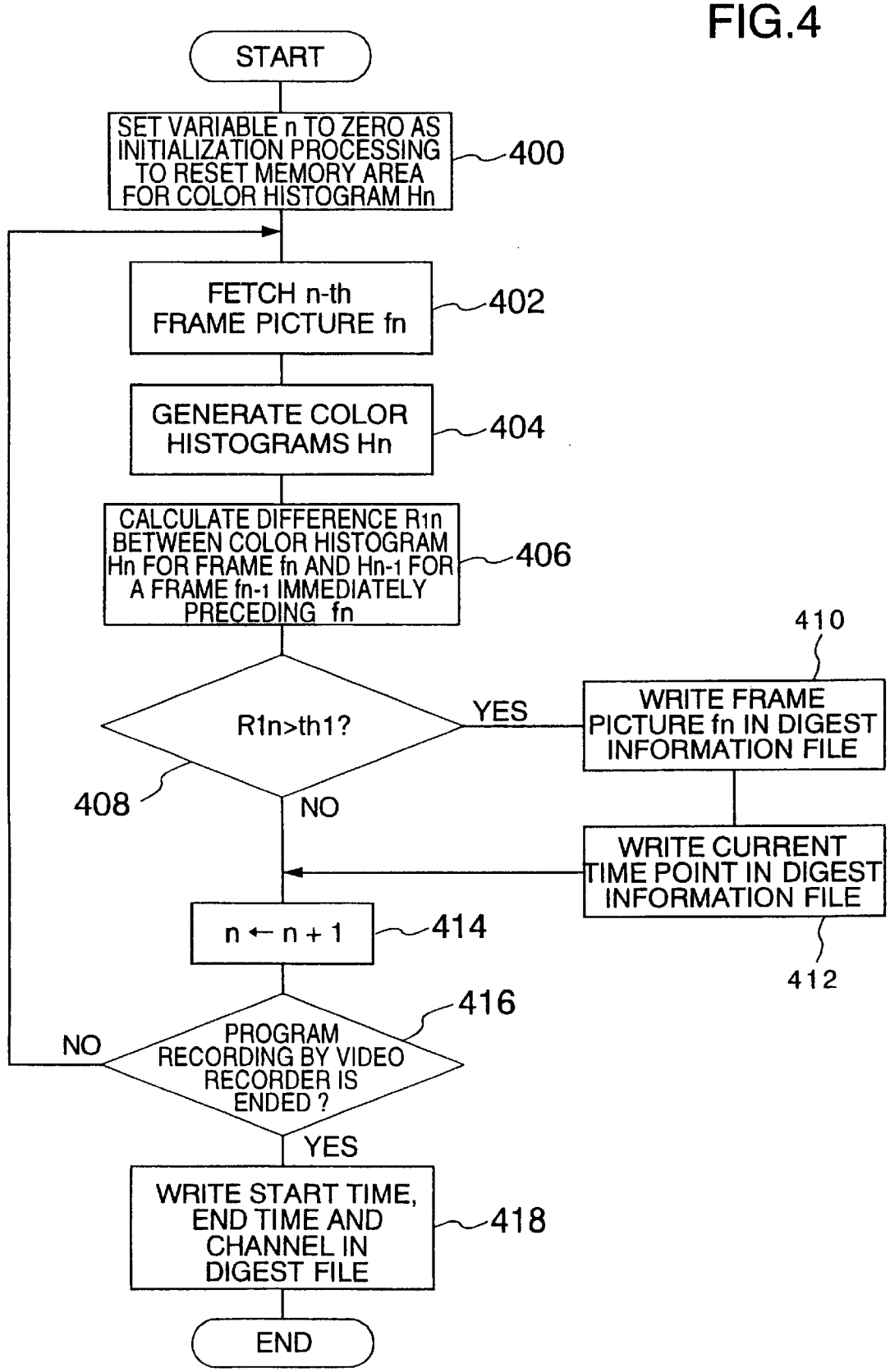
FIG. 4 is a flow chart showing, by way of example only, a digest making program which can be executed by the CPU shown in FIG. 1.

When the control signal 17 informing that the video recording/reproducing apparatus has started recording is detected in the digest making apparatus in a step 1303, then the digest making program 143 illustrated in a flow chart of FIG. 4 is executed for the frame pictures stored in the frame storing area 145 in parallel with the recording of the video performed by the video recording/reproducing apparatus (step 1304 in FIG. 13). When it is detected that the recording of the video by the video recording/reproducing apparatus has come to an end (step 1305) and when a digest picture as generated has been stored in the digest information storing area 146 (step 1306), then the status of the digest making apparatus 1201 is checked. Upon detection of an operation end signal of the digest making apparatus (step 1307), a preparation processing for protecting file data resident, for example, in a cache memory from being destroyed due to power-off by writing such file data in a magnetic disk storage (step 1308). When the preparation processing mentioned above has been completed, the digest making apparatus 1201 turns off the power supply source incorporated in the digest making apparatus itself (1309).

Figure 14:
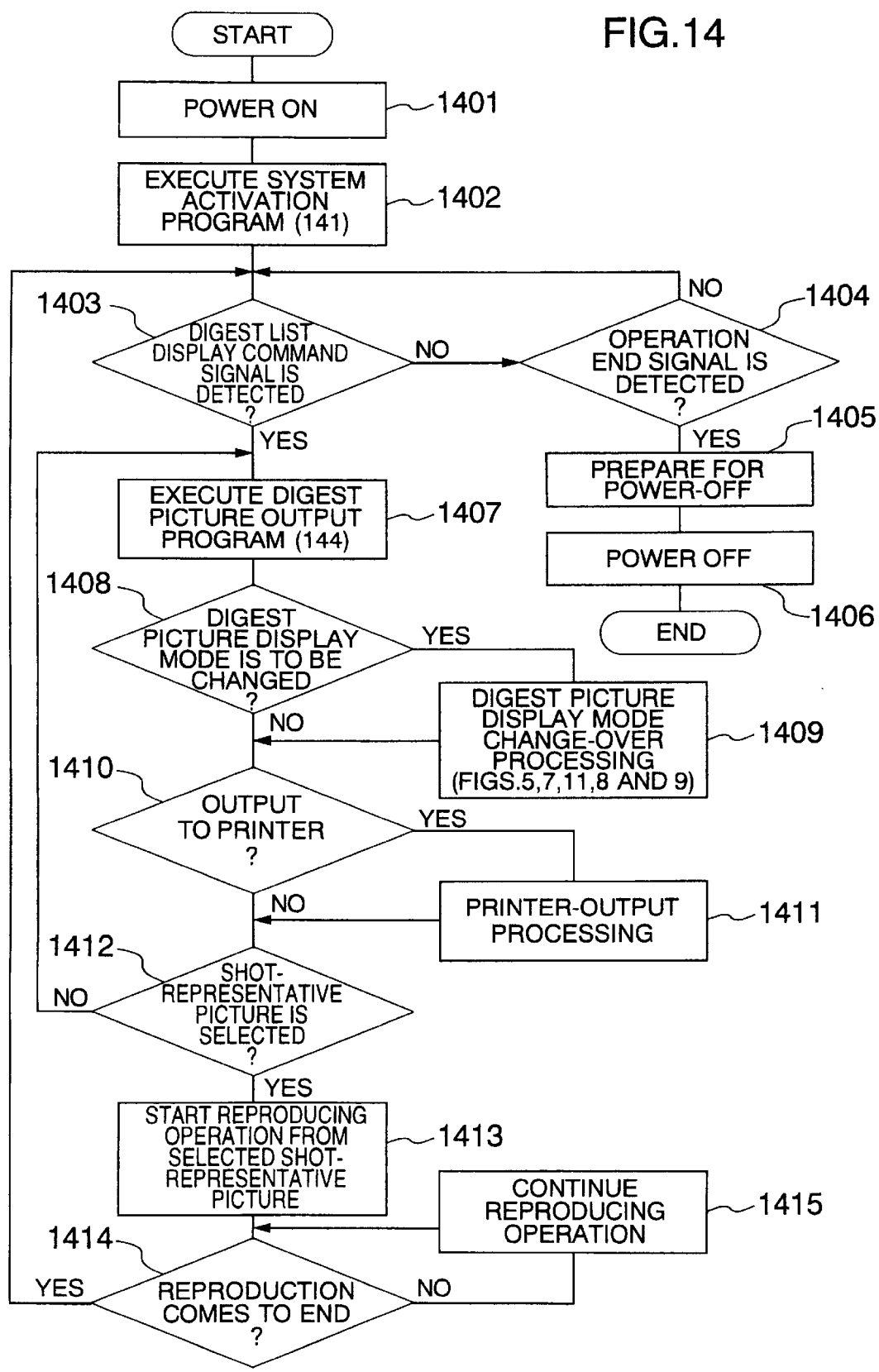
FIG. 14 is a flow chart for illustrating, by way of example only, a procedure for reproducing a digest picture according to the teachings of the present invention.

Next, referring to FIG. 14, description will be directed to operation of the digest making apparatus involved upon reproduction of the video recorded by the video recording/reproducing apparatus. As in the case of the recording operation described above by reference to FIG. 13, upon power-on of the digest making apparatus 1201 (step 1401), the CPU 13 starts processing operations in accordance with the activation program 141 stored in the main memory 14 (step 1402). When the user inputs a signal commanding display of a digest list picture in the state of the video recording/reproducing apparatus in which a recording medium having a video recorded thereof has been loaded and when the digest making apparatus detects the list display command signal (step 1403), the digest picture output program 144 is then executed (step 1407). When a processing end signal of the digest making apparatus is detected in the state where the digest output processing is not performed, a system end procedure is executed for the digest making apparatus by following those processing steps 1404 to 1406 which are similar to the steps 1307 to 1309 described hereinbefore by reference to FIG. 13.

Now, the digest output program is executed, whereby the digest picture is outputted to the television receiver. The digest picture as outputted can be displayed in one of several display modes, which will be elucidated later on by reference to FIGS. 5, 7 and 11. When the user inputs a request for change of the digests picture display mode (step 1408), a digest picture display mode change-over processing is performed for changing the current display mode to other one commanded by the user (step 1409). On the other hand, when the user inputs a command for printing out a digest picture by the printer, the digest picture being displayed on the television receiver is converted into an appropriate printer control code signal to subsequently undergo a print processing by the printer (step 1411). Furthermore, when a representative picture of a shot or scene (hereinafter also referred to as the shot-representative picture) selected from the digest pictures being displayed on the television receiver (step 1412), the video recording/reproducing apparatus is so controlled by the reproduction control program 148 that the reproducing operation is performed on the recording medium placed or loaded in the video recording/reproducing apparatus, starting from the position designated by the selected shot-representative picture (step 1413). Reproducing operation of the video recording/reproducing apparatus is enabled (step 1415) until a signal indicating an end of reproduction of the video from the video recording/reproducing apparatus is detected in a step 1414. Upon detection of the video reproduction end signal mentioned above, the digest making apparatus resumes the state which takes place immediately after execution of the activation program.

The information commanding the display mode for the digest picture to be displayed on the television receiver, quantity or other relevant information as inputted by the user is transmitted to the CPU 13 of the digest making apparatus by way of the input device 15 such as a remote controller, a pointing device or the like belonging to the video recording/reproducing apparatus. Concerning the input keys required for the input device 15, description will be made later on by reference to FIG. 10.

In the foregoing description, it has been assumed that the video recording/reproducing apparatus and the digest making apparatus are implemented independent of each other. However, it is self-explanatory that the video recording/reproducing apparatus imparted with the digest picture making function or capability falls within the scope of the present invention.

Figure 5:
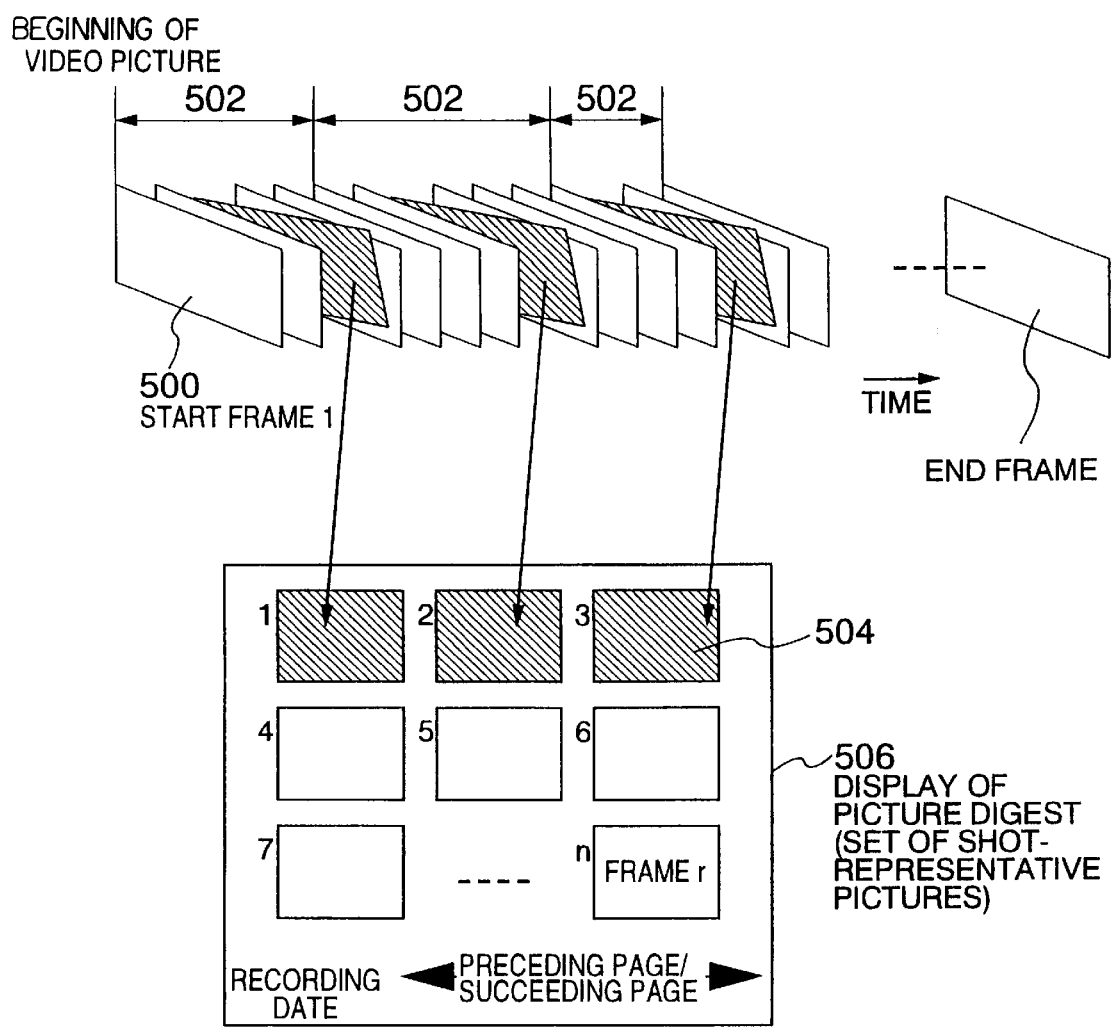
FIG. 5 is a view for illustrating, by way of example, how to generate a digest (list) picture for a television program according to the teaching of the invention.

Next, referring to FIG. 5, description will briefly or generally be made of the digest picture which is generated according to the teachings of the present invention.

With the phrase "digest picture" as used herein, it is intended to mean a set of pictures of scenes or shots representative of a video (television program), which should preferably be displayed in a list. More specifically, referring to FIG. 5, a numeral 500 denotes a video shown schematically in the form of a frame sequence or row composed of frames to be displayed time-sequentially. A video is divided or classified on a shot-by-shot (or scene-by-scene) basis, wherein a representative frame 504 is picked up from each of the shots 502, and a list of shot-representative pictures is generated. In FIG. 5, a reference numeral 506 denotes a typical example of a list of shot-representative pictures (i.e., an example of the digest list picture) as displayed. Information as displayed contains information concerning the date of recording a relevant video (television program) for which a digest picture is to be generated and a sequence of shot-representative pictures extracted from the individual shots or scenes, respectively, of the video (or television program). In the case where all of the shot-representative pictures can not be displayed on a single display screen, they may be displayed in succession. Alternatively, limitation may be imposed onto the number of the shot-representative pictures to be displayed or the areas of the screen allocated for the display of the individual shot-representative pictures, respectively, may be decreased. As a method of limiting the number of the shot-representative pictures to be displayed, there may be adopted a technique disclosed in U.S. patent application Ser. No. 08/601,363 filed on Feb. 16, 1996, now U.S. Pat. No. 5,818,439, entitled "VIDEO VIEWING ASSISTING METHOD AND A VIDEO PLAYBACK SYSTEM THEREFOR" based on Japanese patent application No. 7-30418 filed on Feb. 20, 1995, which has some inventors in common with the present application and is assigned to the same assignee as the present application. The numerals laterally affixed to the shot-representative pictures 504, respectively, indicate a temporal sequence in which the shot-representative pictures are to be displayed. Such ordering number may be replaced by relevant broadcast times. Of course, such numerical display may be omitted so far as the information concerning a pre-determined display sequence of the shot-representative pictures such as "from top left to bottom right" is provided in a user's manual or the like.

Now, the meaning of the term "shot" is clarified. The term "shot" is intended to mean a continuous portion of the video for a continuous scene picked up by using a single camera for a substantially consistent scene. To say it in another way, the term "shot" is a minimum unit of a motion picture which can be considered as one consistent or consolidated set of frame pictures which is meaningful not only from the picturing viewpoint but also in respect to the content. With the display of the digest picture in the form of a list of the shot-representative pictures in the manner described above, a flow of the video (television program) as well as the sequence of the shots and correlations thereof can readily be grasped as a whole because a large number of scenes can be displayed at one time. Thus, the contents of the video or the television program of concern can be seized relatively easily. In other words, very useful picture digest information is now made available by the present invention.

Next, description will be directed to the digest making program 143, the digest picture output program 144 and the display modes, and a file structure of the digest picture stored in the digest information storing area 146. Since the input/output interface 11, the video digitizer 12, the activation program 141 and the picture fetch program 142 can be realized by resorting to conventional techniques, description thereof will be unnecessary.

FIG. 4 is a flow chart for illustrating the digest making program 143, which is executed by the CPU 13. Referring to the figure, the CPU 13 sets a variable n to zero in the initialization processing to thereby reset a memory area for color histograms ($H_n$) which are used as a reference for identifying the shot-representative picture (step 400 in FIG. 4). The memory area for the color histograms is prepared as a part of the main memory 14. Fetching of the frame pictures is effected in synchronism with detection of the synchronizing signal contained in the video signal, herein a frame identification number $f_n$ is affixed to each of new frames as they are fetched (step 402). At this juncture, it should be mentioned that the affix n is a variable used only for convenience of elucidation of correspondence relations between the frames and a variety of variables and need not be entered into the description of the program in practice. Subsequently, the color histograms $H_n$ are generated for the frame pictures $f_n$ as fetched (step 404). Parenthetically, with the phrase "color histogram", it is contemplated to mean a frequency of appearance of pixels (or picture elements) presenting a same color in one frame picture. By way of example, in case a color histogram of 64 colors with two bits allocated to each of R-, G-, B-colors is to be created, the colors for the pixels of the frame are degenerated to 64 colors each of 6 bits by representing the R-, G-, B-color values for the individual pixels of the frame with only two more significant bits for each of the R-, G-, B-colors, whereon the number of the pixels for which the color are degenerated is counted. In that case, the color histogram may be represented by a frequency array $H_n(i)$, wherein the variable affix (i) assumes a value in a range of "0" (zero) to "63". For example, when the variable i assume the value of zero, the frequency $H_n(0)$ indicates the number of pixels which exist within one frame and for which the two more significant bits of the R-, G-, B-color values are zero for all the R-, G-, B-colors. Subsequently, in a succeeding processing 406, a frequency difference $R1_n$ between the color histogram $H_n$ for a frame $f_n$ and that for a frame $f_{n-1}$ which precedes immediately to the frame $f_n$ is determined. The frequency difference $R1_n$ between the successive color histograms can be determined by using appropriate calculating equations such as those employed in the $x^2$-test or the like. In this conjunction, a method disclosed in JP-A-2-230930 (corresponding to U.S. Pat. No. 5,083,860) may be adopted for determining the frequency difference. In a next processing step 408, it is checked whether or not the difference $R1_n$ exceeds a threshold value th1. When the former exceeds the latter (i.e., when the answer of the step 408 is "yes"), decision is then made such that the successive frames for which the frequency difference exceeds the threshold value belong to different shots, respectively, i.e., that the shot changes from one to another or an inter-shot transition occurs, to say it in another way, whereupon the frame picture $f_n$ is stored in the digest information storing area 146 as the digest information in a step 410. Additionally, the time point at which the digest information is stored or fetched is also written in the relevant file as the current time point information corresponding to the frame picture $f_n$ (step 412). In the system according to the present invention, the digest picture is generated concurrently with the recording of the video (television program) in the video recording/reproducing apparatus. Accordingly, the current time point as stored represents the time point at which the video was received. In case the amount of data for the frame picture as fetched is extraneously large for the digest information or when an obstacle or difficulty is encountered in execution of the processing because too much time is taken to write such large amount of data in the file, the fetched frame picture is contracted before being written in the file. With the phrase "contraction of the frame picture", it is intended to mean that the amount of data representing physically the frame picture is diminished or reduced. To this end, there may be conceived in practical applications a method of decreasing the amount of information by compressing the frame picture information itself or a method of reducing the amount of information for the frame picture by decreasing the number of pixels constituting the frame picture. Next, in a processing step 414, "n" is incremented by one. In this manner, decision as to occurrence of the inter-shot transition (i.e., change of the shot from one to another) and the fetching/ storing of the leading frame picture indicating the inter-shot transition are carried out until the program recording by the video recording/reproducing apparatus comes to an end, whereon the leading frame pictures for the shots are stored in the digest information storing area 146 as the shot-representative pictures, respectively.

FIG. 6 shows a file structure for the data stored in the digest information storing area 146. Referring to the figure, a reference numeral 600 designate a header information field containing the information concerning the file as a whole such as information for identification of the file discriminatively from other and a total number of shots as registered. A reference numeral 602 designates a table which indicates addresses at which the shot-representative pictures are stored, respectively. More specifically, contained in the table 602 are offset values which indicate the positions or locations where data of the shot-representative pictures of the individual shots are stored in the file, respectively. These offset values are contained sequentially in a number corresponding to the total number of the shots. Similarly, a table 604 is provided for containing information concerning the time points at which the shot-representative picture of the shots were fetched, respectively, (i.e., broadcast times), while a table 606 serves for containing information concerning the attributes. When storage of other relevant information is required, a number of tables similar to those mentioned above may be prepared as desired. At this juncture, it should be mentioned that such correlations are established among the tables mentioned above that the address information stored at the same position as counted from the first of each table belongs to the information concerning one and the same shot-representative picture. Further, in FIG. 6, Reference numerals 608 to 618 designate data areas for storing the individual information, (e.g. data for the shot-representative pictures, the fetched time point, the attribute information or the like. Parenthetically, of the information mentioned above, the header information 600 and the table information 602 to 606 can not be fixed so long as the digest picture making processing does not come to an end. As can readily be appreciated, not only the total number of the shots as recorded but also the size of the table for containing the addresses for storing the information of the shot-representative pictures depends on the total number of the shots, and thus can not be fixed until the digest picture generating processing has been completed. In the course of the digest picture generating processing, the information mentioned above is temporarily stored in an area secured on the main memory 14 of the digest making apparatus with a margin more or less. After or upon completion of the digest picture making processing (which corresponds to completion of execution of the step 416 illustrated in FIG. 4 and practically coincides with a time point at which the processing of extracting the shot-representative pictures from the video (television program) of concern comes to an end), the information stored temporarily as mentioned above is finally recorded in the digest information storing area 146 with the file structure or format shown in FIG. 6 which is compatible with the size of the memory device used in reality. This corresponds to the step 418 in the digest picture making processing illustrated in FIG. 4. If the power supply of the digest making apparatus should be turned off without carrying out this recording processing step (step 418), the digest picture generated with effort will be lost, to a great disadvantage. Accordingly, it is necessary to confirm without fail whether the digest picture information has really been stored, before terminating the digest picture making procedure. In this conjunction, it is preferred to store in addition to the information mentioned previously the address information indicating the positions for reproduction on the recording medium which correspond to the time points at which the shot-representative pictures was broadcast, respectively, provided that the digest making apparatus is imparted with a function or capability of performing communication and control for the video recording/reproducing apparatus such as a VTR or the like. Thus, the user can reproduce the recorded program, starting from the record position corresponding to the shot-representative picture designated by the user while he or she is watching the digest list picture (i.e, a list of the shot-representative pictures). Besides, by fetching and recording sound information temporally corresponding to the shot-representative pictures or in the vicinity thereof, the content of the digest picture can be more deepened, which means that the amount of information for allowing the user to understand the content of the program indicated by the shot-representative picture can be increased in appearance even when the reproducing operation is not performed in reality for the recording medium (e.g. even when the video recording tape is not played back). In this conjunction, it can readily be appreciated that the recording of the sound information requires a much smaller amount of data, imposing less requirement concerning the storage capacity when compared with the data amount for the motion picture. Incidentally, it is easy for those skilled in the art to prepare the file structure illustrated in FIG. 6 in such a structure that the sound information can additionally be stored or recorded. Parenthetically, storing or recording of the sound information obtained in the vicinity of the shot-representative picture may be realized by fetching the sound information during a predetermined period, beginning temporally with the start position of the shot-representative picture.

Figure 7:
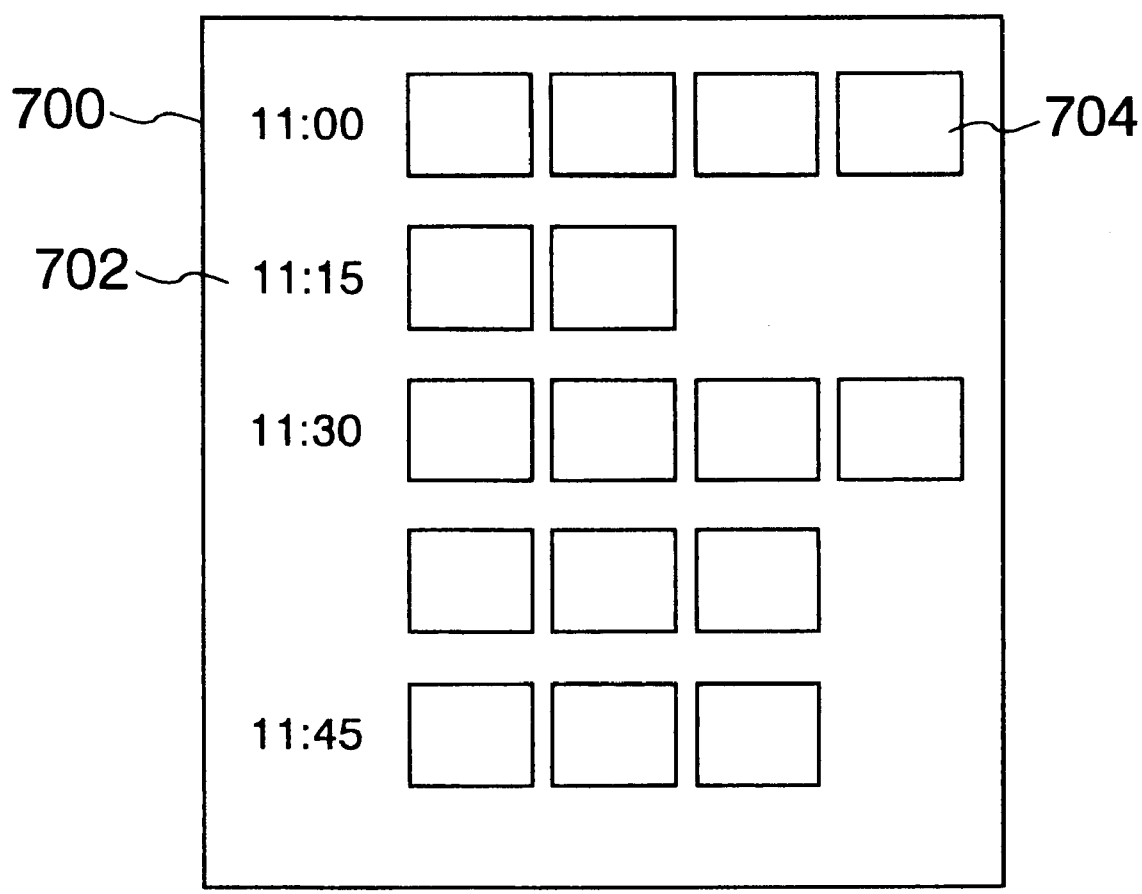
FIG. 7 is a view for illustrating, by way of example, a form or format in which a digest picture is displayed.

FIGS. 5, 7 and 11 illustrate examples of the digest picture, respectively. In conjunction with the digest pictures, description has previously been made by reference to FIG. 5. It should however be added that the digest picture may be displayed over the whole area of the display screen of the television receiver or at a local area thereof such as an area referred to as "window". Incidentally, it can readily be appreciated that the broadcast time as well as the identification number affixed to each of the shot-representative pictures provides a reference for starting the reproduction of a recorded television program.

FIG. 7 is a schematic diagram for illustrating another example of display of a digest picture. Referring to the figure, in a display area 700, recording time points denoted generally by a reference numeral 702 are displayed at a predetermined time interval, starting from a record starting time point. In the case of the example illustrated in FIG. 7, the recording time points are displayed in a column with a time interval of fifteen minutes, starting from a time point "11:00". In each of rows displayed in association with the recording time points, respectively, there are displayed several shot-representative pictures at the right side as viewed in FIG. 7. The shot-representative pictures in each row made appearance during a temporal period extending from the time point inserted at the left-hand side of the row to the time point indicated at the left-hand side of a row just below the first mentioned one. Thus, by displaying the shot-representative pictures at a constant time interval so as to facilitate recognition of correspondences therebetween, as mentioned above, search for a desired scene or shot on the basis of the time information can be much facilitated. By way of example only, let's suppose a Western television program story of which development, turn and conclusion are clear and the time point for a climax scene (e.g. a time point at which two gun men face in opposition to each other with their hands just off above the revolvers makes an appearance) can be predicted about forty minutes past eight and a program in which a time point for broadcasting a predetermined topic is known, the structure illustrated in FIG. 7 is extremely advantageous in searching the scene or shot such as mentioned above. Besides, the format in which the time points are displayed in a vertical column conforms with a layout of a television program column in newspaper, magazines or the like known universally at present provides another advantage that the content of the digest list picture can easily be understood because the format thereof bears similarity or correspondence to those in newspapers, magazines or the like.

In conjunction with the display in the format elucidated above, it is to be mentioned that when a large number of the shot-representative pictures contained in a given time zone increases, they may be displayed in a correspondingly increased number of rows, as in the case of the time zone "11:30" shown in FIG. 7. However, an excessively large number of the shot-representative pictures as a whole will present an obstacle to quick grasp or understanding of the picture contents. For this reason, it is preferred to limit the number of the shot-representative pictures so that the number of the shot-representative pictures to be displayed in each time zone can fall within a predetermined range of values. This can be accomplished by resorting to a thinning-out processing, which will be elucidated below by referring to FIGS. 8 and 9.

Figure 8:
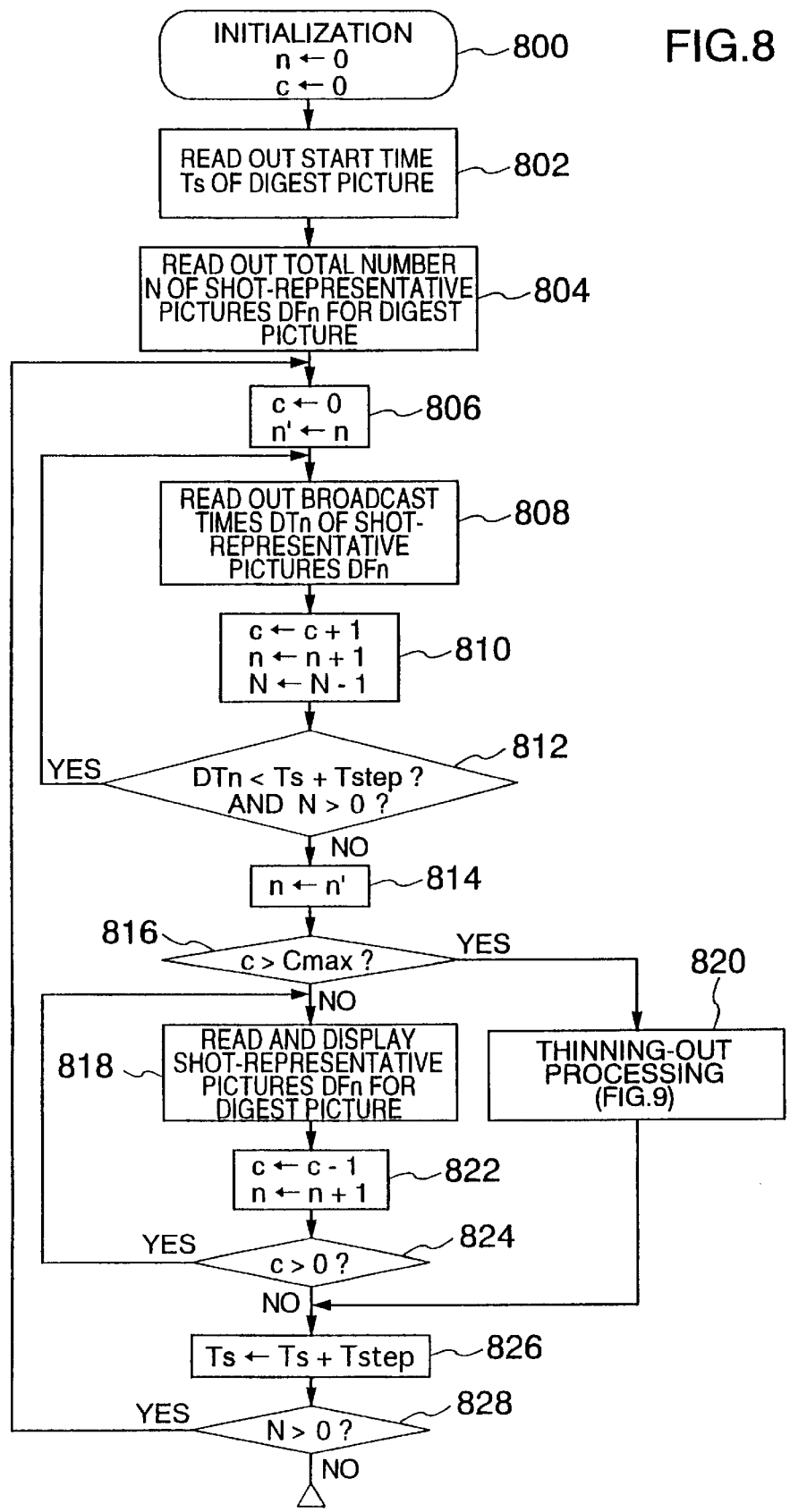
FIG. 8 is a flow chart illustrating, by way of example, a processing procedure for generating the digest picture shown in FIG. 7.

FIG. 8 is a flow chart illustrating a processing procedure for displaying a list of shot-representative pictures (i.e., digest picture) in which a thinning-out processing method is adopted. When a request for the thinning-out processing is detected as an option upon reception of a request for the display of a list of shot-representative pictures from the user, the processing procedure illustrated in FIG. 8 is started as one of the digest picture display mode changing processings which corresponds to the step 1409 shown in FIG. 14. Referring to FIG. 8, initialization processing is first performed in a step 800 to thereby set the variables n and c to zero. Subsequently, in a step 802, a relevant start time is read out from the digest picture information file generated in the manner described hereinbefore, whereupon the start time is placed in the variable Ts in the step 802. In succession, in a step 804, a total number N of the representative pictures DFn recorded in the record file stored in the digest storage area of the main memory 14 is read out. Next, a counter c provided for counting the total number of the shot-representative pictures contained in a given time zone of concern is reset to zero, and the current value of n is saved to n' in a step 806. At this time point, a list of the values of the variable Ts is displayed at the left side of the list. Next, the broadcasting time DTn of the n-th shot-representative picture DFn is read out from the file of the digest picture information in a step 808. In a succeeding step 810, the variables c and n are each incremented by "1" (i.e., added with one) while the total number N is decremented by "1" (i.e., subtraction of "1" from N). In this manner, every time the broadcasting time DTn becomes smaller than "Ts+Tstep" with the total number N being greater than zero, the processing step 808 is resumed, whereupon execution of the processing procedure described above is repeated (step 812). In this conjunction, the term "Tstep" mentioned above represents a temporal width or duration of the time zone. More specifically, when the list of the shot-representative pictures is to be prepared with a time interval of e.g. 15 minutes, the value of Tstep is "15 minutes". Through repetitive execution of the processing procedure from the steps 808 to 812 inclusive, the number of the shot-representative pictures contained in the time zone having the width Tstep from the value Ts can be determined by the counter c. In a step 814, the saved value n' is restored to n. In case the content of the counter c is greater than a value Cmax, a thinning-out processing 820 described hereinafter is performed. If otherwise, the representative pictures DFn which corresponds to the numerical value indicated by the counter c are read out from the file to be sequentially displayed in the form of a list (i.e., digest list)in steps 818 to 824. Incidentally, the symbol "Cmax" represents a maximum number of the shot-representative pictures which can be displayed in each of the time zones. By way of example, when the maximum number of the shot-representative pictures which can be displayed in a row at a right-hand position relative to the time zone is set to the value Cmax, the shot-representative pictures can be displayed in one row in each of the time zones. Finally, the variable Ts is added with Tstep in a step 826. Unless the total number N becomes zero, the processing procedure is restored to the step 806 to be executed again. If the total number N is "0", then the digest list picture display processing procedure comes to an end.

Figure 9:
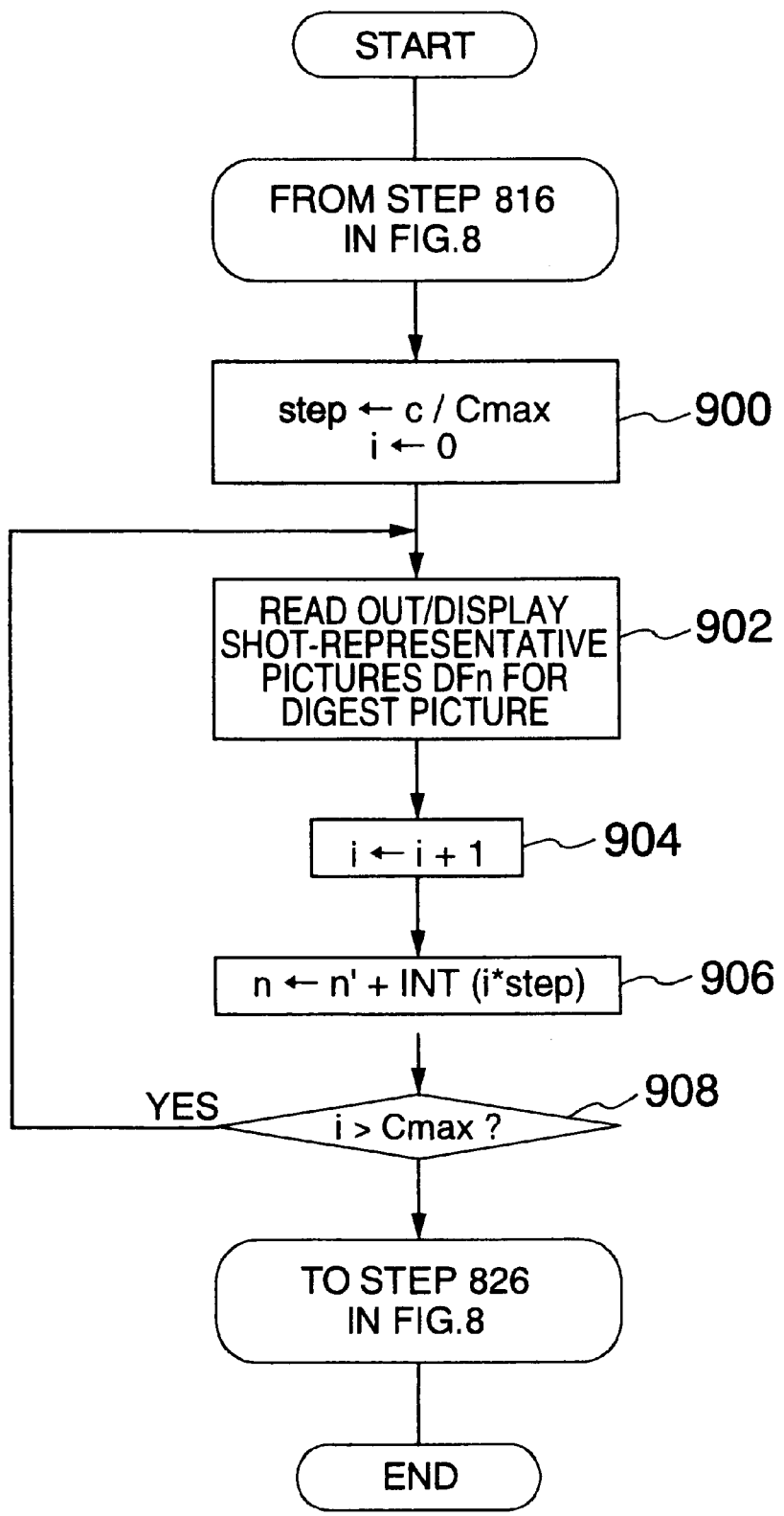
FIG. 9 is a flow chart for supplementing the one shown in FIG. 8.

FIG. 9 is a flow chart for illustrating in detail the thinning-out processing step 820 mentioned previously. Referring to the figure, a quotient resulting from division of the counter value c by the maximum number Cmax defined previously is placed in a variable "step" which can deal with decimal parts, while a counter i is set to zero in a processing step 900. In this conjunction, the variable "step" represents an interval at which the thinning-out processing is to be validated. Subsequently, n-th shot-representative picture is read out from the digest information file to be displayed in the list. In a step 904, the value of the counter i is incremented by one, while a product of the values i and "step" is converted to an integer with the decimal part being rounded off or up, whereon the integer is added with n', the resulting sum being set as the value of the variable n (step 906 in FIG. 9). When the counter value i is smaller than the maximum number Cmax, i.e., when the display of the shot-representative pictures corresponding to the value Cmax is not yet completed, the processing step 902 is resumed, whereupon the procedure described above is executed again.

In the case of the example described above, the thinning-out processing is performed on the shot-representative pictures in a sequence in which they were fetched regardless of the time points at which they were broadcast. However, the invention is never restricted to such thinning-out processing but such a method may equally be adopted in which the time zone is divided into a number of equal parts which corresponds to the numerical value of Cmax, wherein the shot-representative pictures of which broadcasting times are closest to the quotients of the division, respectively, may be displayed. By way of example, assuming that the maximum number of displayable shot-representative pictures is "5", the variable Ts represents "11:00" and that the time zone width Tstep is "15 minutes", then the shot-representative pictures fetched every three minutes, i.e., at the time points closest to "11:00", "11:03","11:06"and so forth, respectively, can be displayed sequentially. In this manner, such unwanted situation which the thinning-out processing method illustrated in FIG. 9 may encounter that the display of the shot-representative pictures is one-sided to a given picture division which contains a succession of many short shots can successfully be disposed of.

In the digest picture display methods described above, there may arise such a case that omission of a part of a program close to the end thereof from the display is preferable. By way of example, consider programs directed to detective dramas or plays. Many of such programs are not so interesting as to be worth viewing again once the tricks have been exposed. Accordingly, the digest picture for this kind of program is made use of as the material for the decision whether the program is to be played back again rather than for understanding the content of the program. To this end, the user may so set the system that the digest picture for a program is inhibited from the display, starting from a given time point inputted by the user. In that case, when the digest picture is displayed, the broadcasting times of the shot-representative pictures are checked to thereby disable the display of the shot-representative pictures from the time point as inputted by the user. However, when the user decides eventually that a given program is not worth viewing, he or she may want to view speedily the whole content of the program. Accordingly, it is preferred to change over the display to that for the digest of the whole program immediately in response to the inputting of a corresponding command by the user. For this reason, the digest picture should preferably be generated throughout the whole program from the start to the end thereof.

Figure 10:
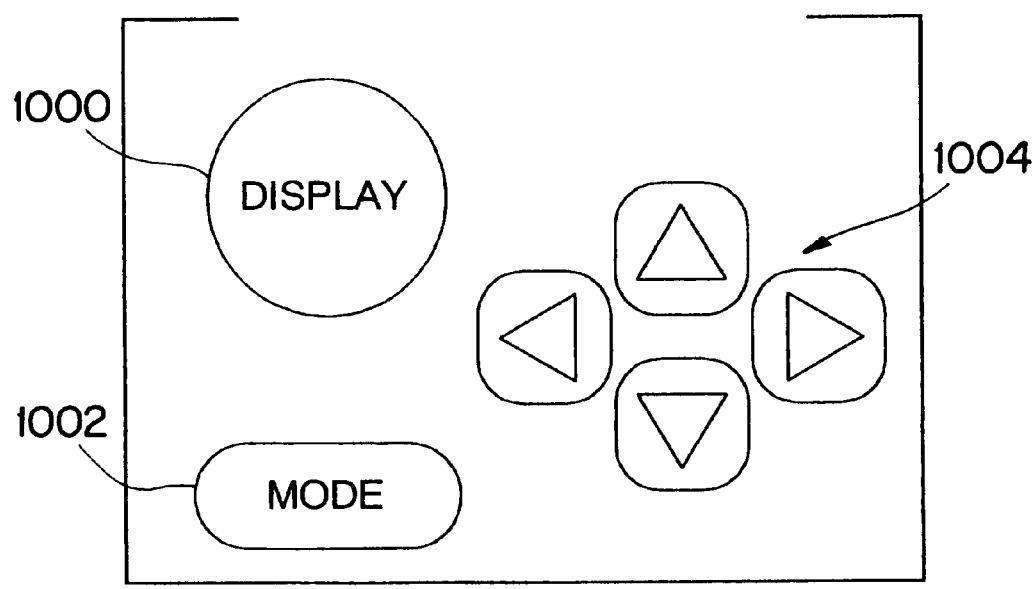
FIG. 10 is a schematic view showing, by way of example only, an interface device or unit employed for viewing digest information in a video recording/reproducing system.

As the interface facility for viewing the digests in the video recording/reproducing apparatus such as a VTR, there may provided a digest picture display button 1000, a display mode change-over button 1002 and an arrow button array 1004 for scrolling the picture being displayed, for pointing objects such icons and for other similar purposes. (See FIG. 10.) When the digest picture display button 1000 is operated after the start of the activation program for the digest making apparatus not only in the program recording but also in response to the digest list picture display request, the display on the screen of the television receiver serving as a picture output device is instantaneously changed over to the mode for displaying a digest list picture of a program recorded on a recording medium loaded currently in the video recording/reproducing apparatus. On the other hand, when recording is to be performed with the video recording/reproducing apparatus, such digest picture list display must be inhibited. However, in the case a television program is simply being enjoyed or a program recorded is being reproduced, the digest list picture can be displayed. Besides, when all of the shot-representative pictures cannot be displayed at one time, they can be checked by scrolling freely the digest picture being displayed by using the arrow button array 1004. Additionally, every time the mode button 1002 is operated, the display form is changed, for example, from the form 506 illustrated in FIG. 5 to that shown in FIG. 7. Moreover, with the aid of the mode button 1002, the display mode can be changed over to the mode for displaying the shot-representative pictures while executing the thinning-out processing. In case a recording medium loaded in the video recording/reproducing apparatus carries a plurality of programs, there makes appearance on the screen a selection-destined information table in which the recorded digest pictures and the ID numbers of the programs recorded by reservation in advance (hereinafter also referred to as the reservation-recorded program) are displayed with correspondence therebetween in such a form, as illustrated in FIG. 11, when the digest display button 1000 is operated. Referring to FIG. 11, in the case of this illustrative example, each of the rows is constituted by a pair of the program recording start/end times and channel information 1100 and a shot-representative picture set 1102 containing a predetermined small number of shot-representative pictures. These rows are displayed in a number corresponding to that of the programs recorded by reservation in advance. By looking over the representative picture sets 1102, the user can visually confirm and select the program whose digest pictures he or she wants to view. For generation of the representative picture set 1102, there may be utilized the thinning-out method described hereinbefore by reference to FIGS. 8 and 9. More specifically, the thinning-out method can be realized by setting the width Tstep of the time zone to the time duration of the program while setting the maximum number Cmax of the shot-representative pictures to the predetermined small number mentioned above. Finally, it should also be mentioned that the buttons required for manipulation of the digest making apparatus such as illustrated in FIG. 10 may be provided in a remote controller dedicated for controlling remotely the operation of the digest making apparatus or alternatively they may be provided in the video recording/reproducing apparatus as parts of standard equipment thereof.

Figure 2:
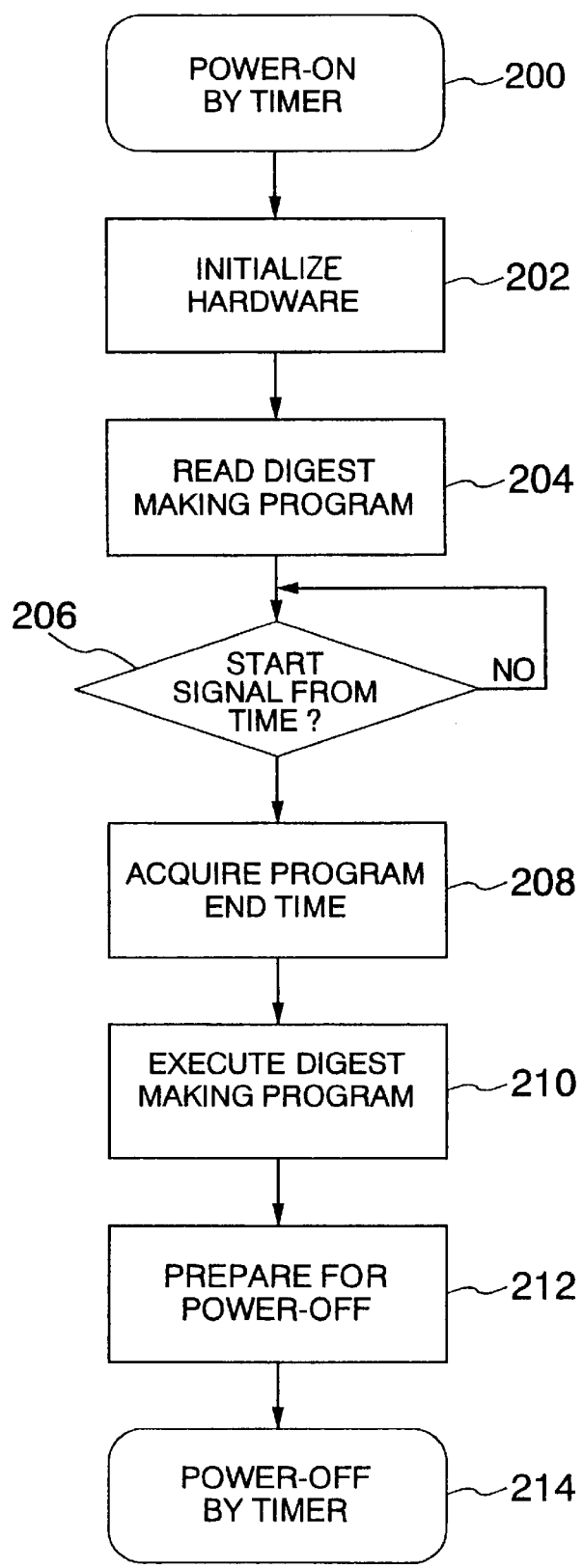
FIG. 2 is a flow chart for illustrating an operation or processing procedure executed by a CPU (central processing unit) in corporated in the digest making apparatus for recording a program as reserved in advance under the control of a timer.
Figure 3:
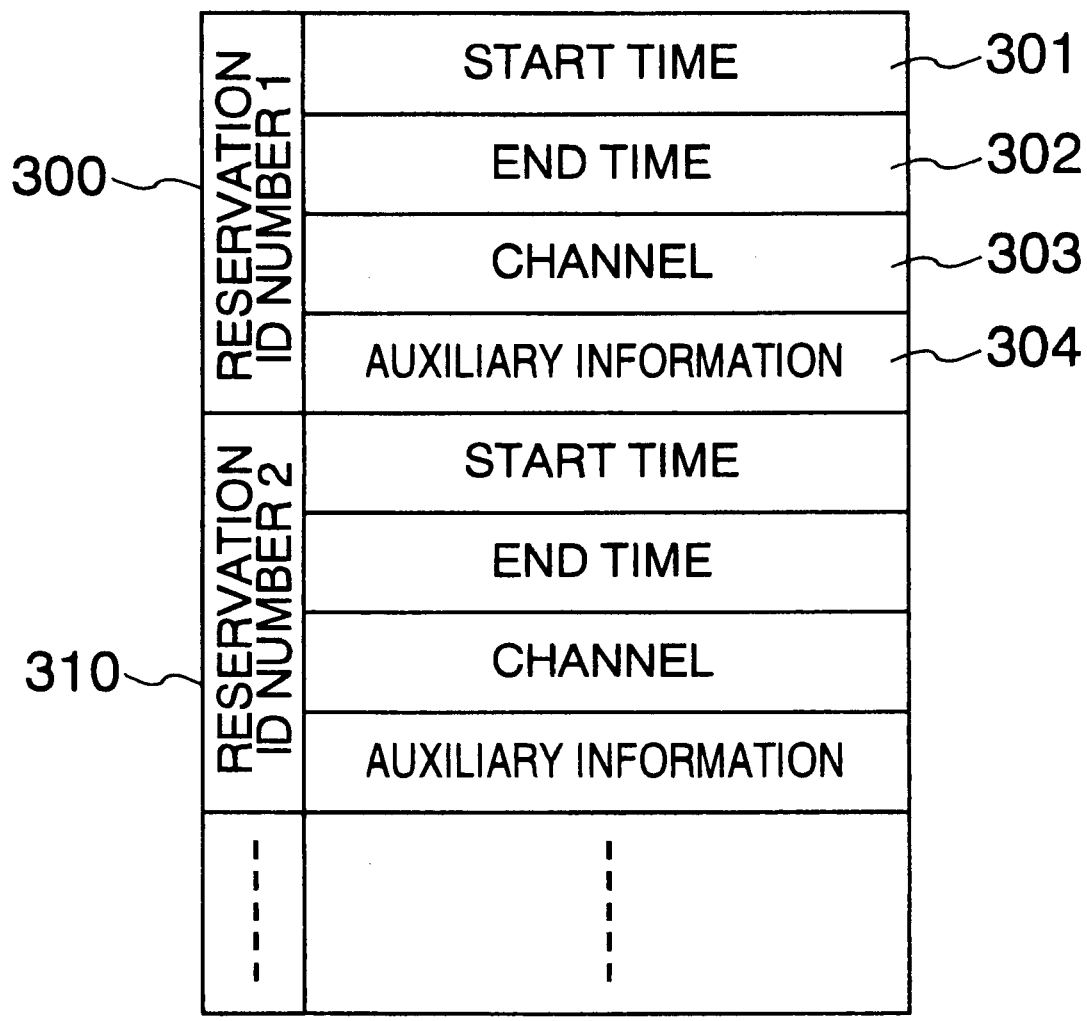
FIG. 3 is a view for illustrating, by way of example only, a data structure of information used for setting a program recording by reservation in advance and stored in a programmable timer.

Next, referring to FIGS. 2 and 3, description will be directed to a processing for starting and stopping operation for generating the digest upon recording of a television program reserved in advance as an additional function of the digest making apparatus described above.

The information 120 for the programmed recording of a given program or programs (hereinafter referred to as the reservation information) set in the video recording/reproducing apparatus is also sent to the digest making apparatus to be stored in the reservation information storing area 147 of the main memory 14. As a result of this, the reservation information of a structure illustrated in FIG. 3 is held in the reservation information storing area 147. Reservation ID numbers are used when a plurality of reservation recordings are set, for identifying the reservations, respectively. A start time 301 represents a start time of a program reserved in advance for recording and assigned with the reservation ID number "1", an end time 302 represents a time at which the program of the reservation ID number "1" is completed, a channel 303 designates a channel through which the program of the reservation ID number "1" is broadcast, and auxiliary information 304 represents subsidiary information such as, for example, a command for printing out by a digest list picture of a program immediately after the recording thereof, etc.

FIG. 2 is a flow chart for illustrating a processing procedure executed by the digest making apparatus for recording a program as programmed the recording start and end times in advance. More specifically, FIG. 2 shows a flow of operations or processings executed by the CPU 13, starting from a time point at which the digest making apparatus is powered on, until it is powered off under the control of the programmable timer provided for performing the reservation recording by the video recording/reproducing apparatus. When the video recording/reproducing apparatus and the digest making apparatus are powered on in a step 200, the CPU 13 executes hardware initialize processings such as setting of input/output ports, interruption addresses, interconnection with peripheral devices under the control of the activation program stored in the main memory 14, which maybe, for example, a read-only memory (ROM) whose contents are protected against loss regardless of turning-off of the power supply (see step 202 in FIG. 2). At that time, it is also decided wither or not the processing operation being executed has been initiated by the programmable timer. For realizing this decision, there may be provided in association with the programmable timer a flag which indicates whether or not timer operation is in progress and which can freely be read by the CPU 13 by way of an input/output port.

The program timer is designed not only to perform on/off-control of a power supply line to the digest making apparatus 1201 by means of a switch such as a relay but also to generate a control signal to the CPU 13, which signal is utilized for generating the digest making start/end signals. At this juncture, it should also be mentioned that a predetermined temporal difference is set between the time points for turning on/off the power supply and the time points for generating the digest making start/end signals. This is because a certain time span will unavoidably intervene between the power-on (step 200) and the program activation (step 204). Besides, stabilization of the signal outputted from analog circuits such as a broadcast program receiving tuner requires some amount of time from the power-on time point. Accordingly, it is preferred to adjust the time point for the power-on of the digest making apparatus so that the power-on processing step 200 is executed in advance to a time point at which a television program to be recorded is scheduled to start (i.e., reservation recording time point as set) by a time required for completing the processing step 204 from the power-on time point. Thus, in response to the recording start enable signal generated by the video recording/reproducing apparatus at a time point at which a broadcast program of concern starts in reality, the digest making procedure is started (step 206). The digest list picture is generated by executing the digest making program 143 in the manner described hereinbefore.

In a processing step 208, information of the broadcast program end time set at the program timer is derived from the reservation information stored in the reservation information storing area 147. In the course of execution of the digest making program (step 210), the current time points are sequentially read out from the timer to be compared with the program end time point. Upon reaching the broadcast program end time, execution of the digest making program is terminated. As an alternative, the timer may be so designed as to generate an end signal at a time point at which the broadcast program is scheduled to end. In that case, generation of the end signal mentioned above is monitored during execution of the digest making program, wherein the latter is ended at a time point at which the broadcast program end signal is detected. In preparation for turning-off of power supply to hardware, a processing for protecting the file data from being destroyed is performed in a step 212. By way of example, the file data remaining in a cache memory are transferred to a disk storage. Upon completion of this preparation processing for the power-off, the CPU sends a corresponding signal for messaging this fact to the programmable timer in a step 214. Unless the CPU is imparted with the capability of sending the power-off preparation processing completion signal, a maximum time required for making the power-off preparation is previously determined so as to allow the programmable timer to turn off the power supply with a delay corresponding to the determined time.

Furthermore, it is preferred to arrange the digest making apparatus such that after generation of a digest picture in parallel with the recording of a television program, a corresponding digest list picture is automatically outputted to a printer, which can be realized by executing a print-out processing after generation of the digest picture file of the structure shown in FIG. 6 and before the power-off of the digest making apparatus. Of course, it goes without saying that the power-off operation has to be delayed for a time taken for printing the digest list picture. By printing out the digest list picture on a sheet of paper, a greater number of shot-representative pictures can be checked or observed at one time with higher resolution when compared with viewing of the shot-representative pictures on the display screen. Besides, without need for troublesome manipulation of power-on/off of the digest making apparatus and the video recording/reproducing apparatus, the user can understand the outline of the recorded television program as a whole at sight upon printing-out of the digest list picture.

It should further be mentioned that the digest picture can be made use of not only for confirmation or observation of the picture contents recorded on recording medium but also for other purposes or applications. By way of example, in the course of reproduction of a television program as recorded, a relevant digest picture may be displayed to thereby allow the user to select a given shot-representative picture from the digest picture so that the television program can be skipped to the scene represented by the shot-representative picture as selected. In this conjunction, when a command for display of a digest picture is inputted, position-information of the frame being reproduced at that time point may be made use of for omitting the shot-representative pictures which precede to a broadcast time corresponding to the position information mentioned above. Thus, skipping or omission of unwanted video portions such as those of commercial intervals can be much facilitated.

In the foregoing description, it has been assumed that the television receiver, the video recording/reproducing apparatus and the digest making apparatus are implemented separately from one another. However, the present invention is never restricted to such arrangement. By way of example, the digest making apparatus according to the invention can be realized as an additional function of a video recording/reproducing apparatus as well. Besides, the digest making apparatus may be implemented as one facility or function of a television set.

As will now be understood from the foregoing, the digest pictures of a program recorded can automatically be generated to allow the user to check the contents of the program instantaneously as he or she desires, whereby it can easily be decided whether or not a given program is worth viewing while mitigating a burden imposed on the user.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the construction and operation illustrated and described. Accordingly, all suitable modifications and equivalents may be resorted to, falling within the spirit and scope of the invention.

What we claim is:

1. A digest making apparatus connected to recording means capable of recording at least a television signal of a television program received through receiving means, for generating a digest list picture constituted by a set of inter-shot transitions in the picture of said television program concurrently with recording of said television program by said recording means, comprising:

an input/output interface for controlling input/output of picture signals supplied to and outputted from the apparatus;

converting means for converting the input picture signal into a frame-based picture signal;

detecting means for fetching said frame-based picture signal and detecting frames in correspondence to said inter-shot transitions of said television program as shot-representative pictures, respectively;

storage means for storing a digest list picture constituted by a set of said shot-representative pictures; and display control means for displaying said digest list picture on external display means connected to said digest making apparatus such that at least one of said shot-representative pictures appears within a time zone arranged in a field indexed by a time point, said time zone beginning at said time point and having a width selected by a user;

wherein a number of shot-representative pictures which can appear within said time zone is limited to a specified maximum number of shot-representative pictures; and wherein said display control means selects ones of said shot-representative pictures which actually appear within said time zone from ones of said shot-representative pictures which are contained in said time zone.

2. A digest making apparatus according to claim 1, wherein information of said digest list picture includes header information for identifying discriminatively a relevant program recorded by said recording means, shot-representative picture information indicating said inter-shot transitions, and information of time points at which said shot-representative picture information is fetched.

3. A digest making apparatus according to claim 1, wherein said display control means controls display of a list of said shot-representative pictures such that at least one of said shot-representative pictures appears within a time zone in a field which is indexed by a time point, said time zone having a predetermined width beginning with said time point.

4. A digest making apparatus according to claim 3, wherein said display control means performs a control such that when a number of shot-representative pictures to be displayed within a given one of a plurality of time zones is set previously, a smaller number of shot-representative pictures than that of shots which can fall within said given one time zone are selected to be displayed.

5. A digest making apparatus according to claim 3, wherein said display control means performs a control such that the shot-representative pictures belonging to a predetermined one of a plurality of time zones are excluded from objects for display.

6. A digest making apparatus according to claim 1, further comprising:

selecting means for selecting a given shot-representative picture from said digest list picture being displayed on said display means; and means for starting reproduction of a relevant television program from a position indicated by a time point at which said given shot-representative picture selected by said selecting means was fetched by said digest making apparatus.

7. A digest making apparatus according to claim 6, further comprising:

means for detecting a picture position in a television program being reproduced; and means for displaying a list of shot-representative pictures starting from said time point.

8. A digest making apparatus comprising:

interface means for fetching information of a time period and a television channel set previously for recording a given television program by reservation in advance;

arithmetic processing means for generating digest information representative of content and composition of said given television program during reception thereof;

timer means for starting and ending operation of said arithmetic processing means on the basis of said information concerning said preset time period; and display means for displaying said digest information generated by said arithmetic processing means within a time zone arranged in a field indexed by a time point, said time zone beginning at said time point and having a width selected by a user, said time zone being included in said time period;

wherein an amount of digest information which can be displayed within said time zone is limited to a specified maximum amount of digest information; and wherein said display means selects a portion of said digest information which is actually displayed within said time zone from a portion of said digest information which is contained in said time zone.

9. A digest making apparatus according to claim 8, wherein a time span of a predetermined length is interposed between a time point at which said arithmetic processing means is powered on and a time point at which an operation for generating said digest information is started.

10. A digest making apparatus according to claim 8, wherein a time span of a predetermined length is interposed between a time point at which said arithmetic processing means is powered off and a time point at which an operation for generating said digest information is ended.

11. A digest making apparatus according to claim 8, wherein said digest information includes information for displaying shot-representative pictures of individual scenes of said television program in the form of a list.

12. A digest making apparatus according to claim 11, wherein said digest information further includes information of time points at which the shot-representative pictures are fetched, respectively, said information of said time points being recorded with correspondence established between said shot-representative pictures and said time points, respectively.

13. A digest making apparatus according to claim 11, wherein said digest information further includes sound information concerning sounds received around the time points at which said shot-representative pictures are fetched, respectively, said sound information being recorded together with said digest information.

14. A digest making apparatus according to claim 11, further comprising display means for displaying an array of the shot-representative pictures of scenes of said television program in a field indexed with a time point, said shot-representative pictures appearing within a time zone having a predetermined duration beginning with said time point.

15. A digest making apparatus according to claim 14, wherein said shot-representative pictures are displayed by selectively thinning out said shot-representative pictures so that a number of shot-representative pictures to be displayed within each of said time zones falls within a predetermined range of values.

16. A digest making apparatus according to claim 11, wherein upon displaying of the digest information, the shot-representative pictures belonging to a predetermined temporal period of said television program are excluded from the objects for display.

17. A digest making apparatus according to claim 11, further comprising a printer for printing said shot-representative pictures.

18. A digest making apparatus according to claim 11, wherein when a plurality of shot-representative pictures are generated for a plurality of different television programs, respectively, sets each composed of a limited number of selected shot-representative pictures for each of said plurality of television programs are displayed in the form of a menu for thereby allowing a given one of said shot-representative pictures belonging to a given one of said sets to be selected for confirmation.

19. A digest making apparatus according to claim 8, wherein said digest information includes information concerning time points at which a television program is started and ended, respectively, and information concerning a channel through which said television program is received, both of said information being recorded together with said digest information.

20. A video recording apparatus equipped with interface means for loading time information for television program recording by reservation in advance and a tuner for receiving broadcast television programs, comprising:

interface means for setting a time period for a given television program and a channel through which said given television program is received, for thereby allowing said given television program to be recorded by reservation in advance;

digest making means for generating digest information representative of contents and composition of said given television program;

timer means for starting and ending operation of said digest making means at time points predetermined by said time period;

digest display mode changing means for changing between a plurality of digest display modes; and display means for displaying said digest information in a form of a list including a plurality of fields indicating time zones set in accordance with a digest display mode designated by said digest display mode changing means, wherein digest information generated in a time zone is displayed in a field indexed by said time zone, said time zone having a width which depends on said digest display mode designated by said digest display mode changing means;

wherein an amount of digest information which can be displayed in said field is limited to a specified maximum amount of digest information; and wherein said display means selects a portion of said digest information generated in said time zone which is actually displayed in said field from said digest information generated in said time zone.

21. A method of making a digest for a television program, comprising the steps of:

fetching a television program for generating a digest by activating a programmable timer;

generating a digest representative of content and composition of a given television program in conformance with a time point at which said given television program is started by means of said programmable timer;

ending the generation of said digest in conformance with a time point at which said given television program is terminated by means of said programmable timer; and displaying the generated digest within a time zone arranged in a field indexed by a time point, said time zone beginning at said time point and having a width selected by a users;

wherein a portion of the generated digest which can be displayed within said time zone is limited to a specified maximum portion of the generated digest; and wherein said displaying step includes the step of selecting a portion of the generated digest which is actually displayed within said time zone from a portion of the generated digest which is contained in said time zone.

22. A digest making method according to claim 21, wherein said step of generating a digest includes the steps of:

fetching a frame picture of said television program every time a synchronizing signal contained in a television signal for said television program is detected;

affixing serial numbers to said frames in a sequential order in which said frame pictures are fetched;

generating color histograms ($H_n$) for the frame pictures as fetched, respectively;

determining a difference ($R1_n$) between the color histogram ($H_n$) for an n-th one ($f_n$) of said frame pictures and the color histogram ($H_{n-1}$) for the (n−1)-th frame picture ($f_{n-1}$) preceding said n-th frame ($f_n$);

comparing the difference ($R1_{n-1}$) with a threshold value (th1);

deciding an inter-shot transition when said difference exceeds said threshold value; and recording said n-th frame picture in a file as at least one part of digest information together with information of a time point at which said inter-shot transition takes place as well as information concerning correspondence between said n-th frame picture and said time point.

* * * * *